United States Patent
Lee

(10) Patent No.: US 9,829,923 B2
(45) Date of Patent: Nov. 28, 2017

(54) FOLDABLE DISPLAY DEVICE

(71) Applicant: SAMSUNG DISPLAY CO., LTD., Yongin, Gyeonggi-Do (KR)

(72) Inventor: Hyun Jae Lee, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 336 days.

(21) Appl. No.: 14/450,432

(22) Filed: Aug. 4, 2014

(65) Prior Publication Data

US 2015/0146387 A1  May 28, 2015

(30) Foreign Application Priority Data

Nov. 22, 2013 (KR) .................. 10-2013-0143134

(51) Int. Cl.
*H05K 1/00* (2006.01)
*G06F 1/16* (2006.01)

(52) U.S. Cl.
CPC .......... *G06F 1/1652* (2013.01); *G06F 1/1679* (2013.01)

(58) Field of Classification Search
CPC .... G06F 1/1626; G06F 3/0481; G06F 3/0488; G06F 3/147; G09G 2354/00; G09G 2380/02; F05B 2220/25; G09F 15/0012; G09F 15/0037; G09F 15/0087; G09F 19/22; G09F 2019/225; G09F 9/301; H05K 1/0281; H05K 5/0017; H05K 7/20954; Y02E 10/721
See application file for complete search history.

(56) References Cited

U.S. PATENT DOCUMENTS

| | | | | |
|---|---|---|---|---|
| 2008/0086925 | A1* | 4/2008 | Yang | .................. H04M 1/0268 40/610 |
| 2013/0076652 | A1* | 3/2013 | Leung | ..................... G06F 3/016 345/173 |
| 2013/0222998 | A1* | 8/2013 | Cho | ....................... G06F 1/1601 361/679.27 |
| 2014/0043741 | A1* | 2/2014 | Smith | ....................... G06F 1/16 361/679.3 |

FOREIGN PATENT DOCUMENTS

| | | |
|---|---|---|
| JP | 3016575 U | 7/1995 |
| JP | 2005-262851 A | 9/2005 |
| JP | 2005-278010 A | 10/2005 |
| JP | 2006-091900 A | 4/2006 |
| JP | 2011-516974 A | 5/2011 |
| KR | 20-1998-0006627 | 4/1998 |
| KR | 20-2001-0011669 | 4/2001 |
| KR | 10-2008-0057909 A | 6/2008 |
| KR | 10-2011-0038167 A | 4/2011 |
| KR | 10-2012-0114761 A | 10/2012 |

* cited by examiner

*Primary Examiner* — Yuriy Semenenko
(74) *Attorney, Agent, or Firm* — Lee & Morse P.C.

(57) ABSTRACT

A foldable display device includes a flexible display panel and a retainer. The flexible display panel includes a first non-folding area, a second non-folding area, and a first folding area between the first and second non-folding areas. The retainer includes at least one first electromagnetic region in the second non-folding area and at least one first magnetic region in the first non-folding area. The first and second non-folding areas face each other when the flexible display panel is in a first folded state in the first folding area. The first folded state is maintained by an electromagnetic force generated between the at least one first electromagnetic region and the at least one first magnetic region.

20 Claims, 6 Drawing Sheets

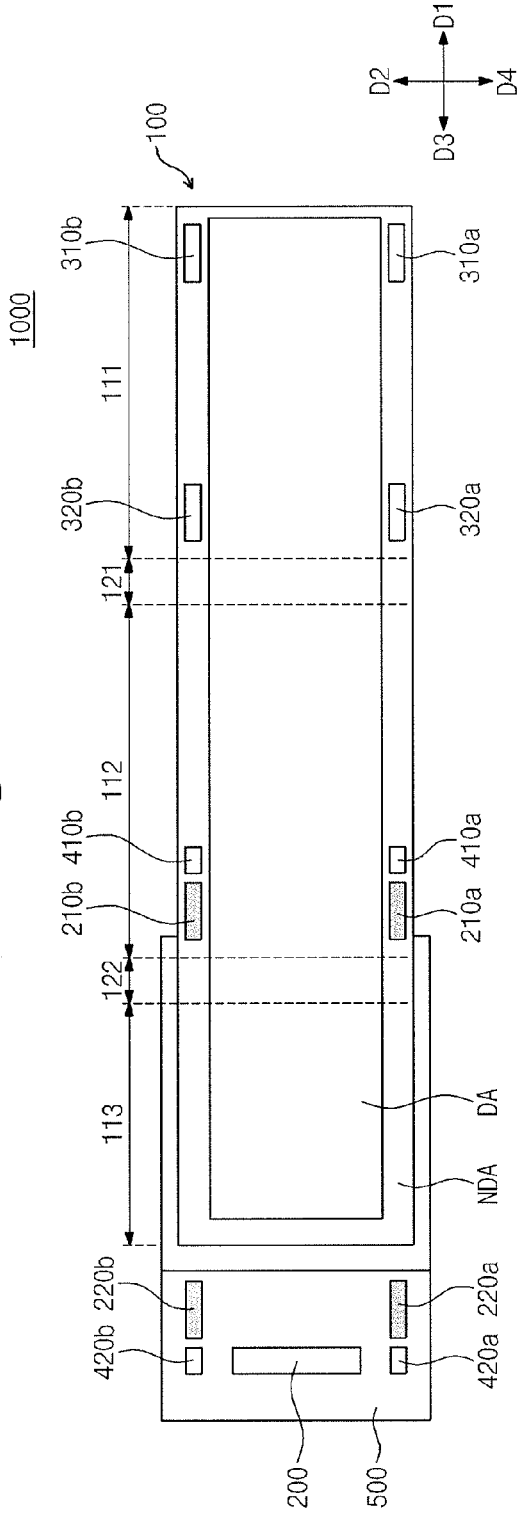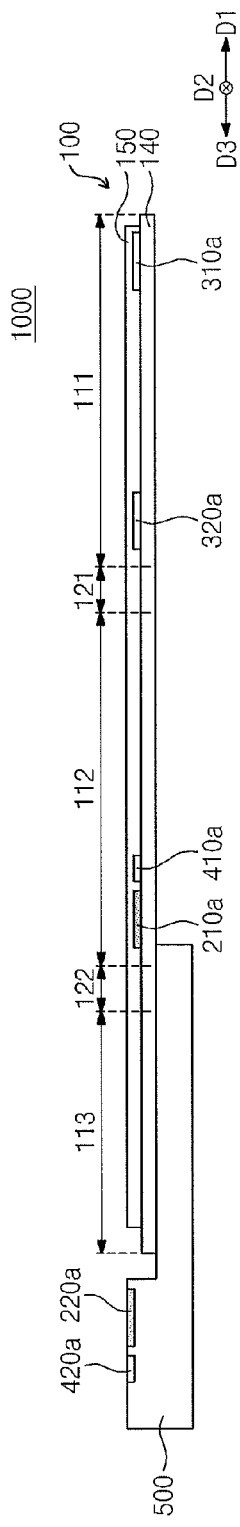

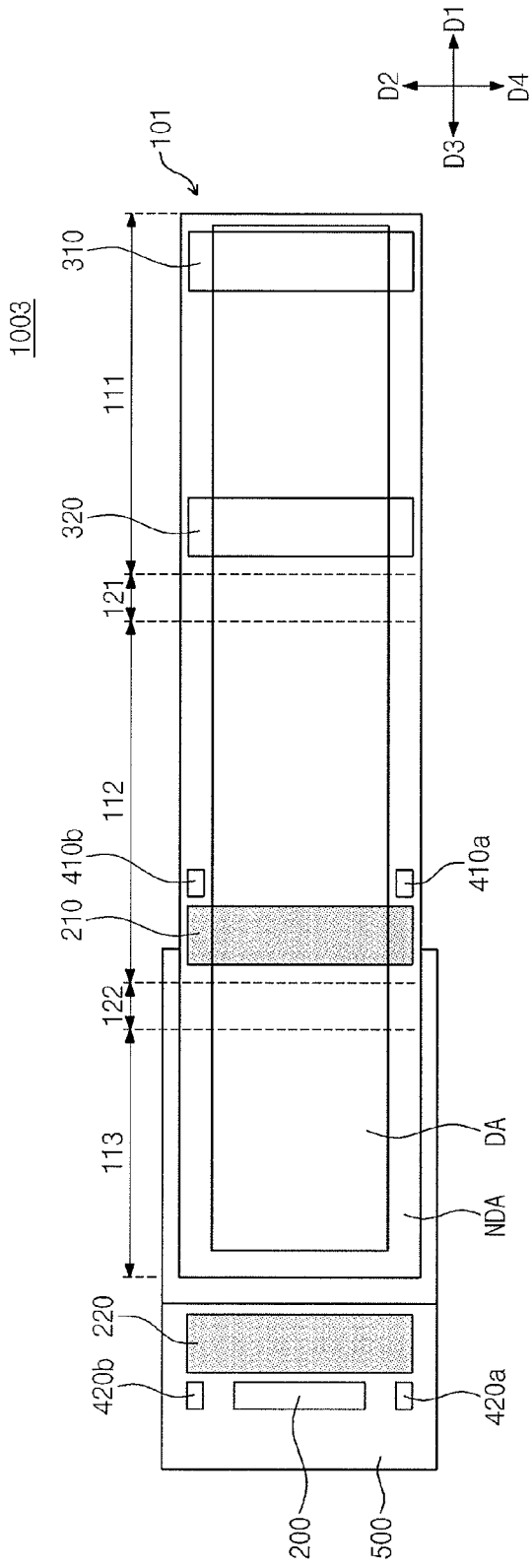
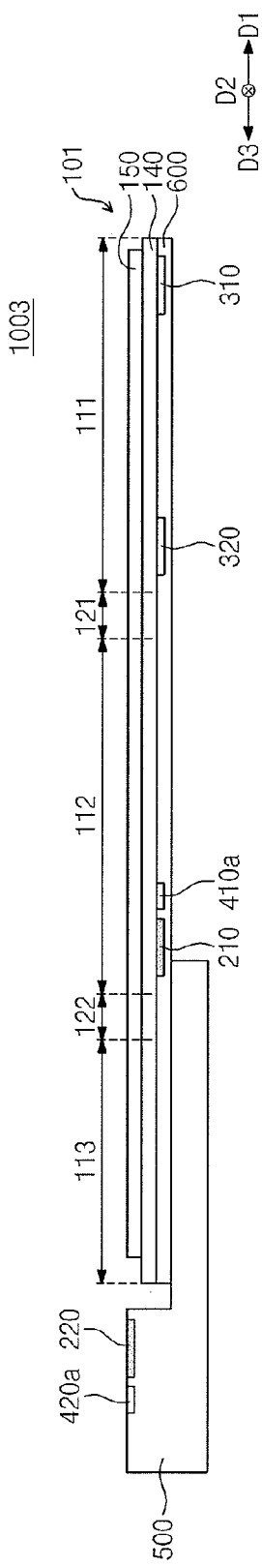

FOLDABLE DISPLAY DEVICE

CROSS-REFERENCE TO RELATED APPLICATION

Korean Patent Application No. 10-2013-0143134, filed on Nov. 22, 2013, and entitled, "FOLDABLE DISPLAY DEVICE," is incorporated by reference herein in its entirety.

BACKGROUND

1. Field

One or more embodiments described herein relate to a foldable display device.

2. Description of the Related Art

Smart phones, digital cameras, notebook computers, navigation devices, smart televisions and other types of electronic devices include display panels. Example of these display panels include liquid crystal display panels, organic light emitting display panels, plasma display panels, and electrophoretic display panels. These panels are rigid and flat, and therefore consume significant space and/or present problems in terms of convenience.

SUMMARY

In accordance with one embodiment, a foldable display device includes a flexible display panel to display an image, the flexible display panel including a first non-folding area, a second non-folding area, and a first folding area between the first and second non-folding areas; and a retainer including at least one first electromagnetic region in the second non-folding area and at least one first magnetic region in the first non-folding area, wherein the first and second non-folding areas to face each other when the flexible display panel is in a first folded state in the first folding area, and wherein the first folded state maintained by an electromagnetic force generated between the at least one first electromagnetic region and the at least one first magnetic region.

The flexible display panel may include a display area and a non-display area, and he at least one first electromagnetic region and the at least one first magnetic region are in the non-display area. The flexible display panel may include an upper plate, a lower plate facing the upper plate, and a light control layer between the upper and lower plates, wherein the lower plate corresponds to the display area and non-display area, the upper plate and light control layer correspond to the display area, and the at least one first electromagnetic region and the at least one first magnetic region are on the lower plate.

The retainer includes a base film attached to one surface of the flexible display panel, and the at least one first electromagnetic region and at least one first magnetic region are on the base film. The first and second non-folding areas may be arranged in a first direction, the first folding area may extend in a second direction crossing the first direction, and the at least one first electromagnetic region and the at least one first magnetic region may extend in the first direction.

The display device may include a plurality of first electromagnetic regions and a plurality of first magnetic regions. The display device may include a sensor in at least one of the first or second non-folding areas, wherein the sensor is to sense whether the flexible display panel is the first folded state. The sensor may include at least one of a proximity sensor, a contact sensor, or a hook sensor.

The display device may include an electromagnet controller to control a driving current to be applied to the first electromagnetic region. The electromagnet controller may receive a sensing signal from the sensor and is to control the driving current in response to the sensing signal.

The display device may include a control board to drive the flexible display panel, wherein the control board is to receive the sensing signal from the sensor and control display of the image based on the sensing signal.

The flexible display panel may include a third non-folding area and a second folding area between the second and third non-folding areas, wherein the flexible display panel is folded a second time in the second folding area, and wherein the second and third non-folding areas face each other to allow the second non-folding area to be disposed between the first and third non-folding areas when the flexible display panel is a second folded state.

The display device may include a frame to support the flexible display panel in the second folded state. The first non-folding area may include a second magnetic region spaced from the at least one first magnetic region, the frame including a second electromagnetic region corresponding to the second magnetic region when the flexible display panel is the second folded state.

The frame may include an upper surface on which the third non-folding area is placed a rear surface opposite to the upper surface, and an inclined surface connected between the upper surface and rear surface, wherein the flexible display panel includes an inclined non-folding area extending from one end of the first non-folding area and facing the inclined surface when the flexible display panel is the second folded state, and wherein the inclined surface includes a third electromagnetic region placed thereon and the inclined non-folding area includes a third magnetic region corresponding to the third electromagnetic region when the flexible display panel is placed on the frame in the second folded state. The frame may have a curved shape which curves in the first direction.

The display device may include a control circuit to drive the flexible display panel, wherein the control circuit is disposed on the frame. The first magnetic region may include a ferromagnetic substance, a paramagnetic substance, a resin-magnetic substance, or a combination thereof. The at least one first electromagnetic region may be formed during manufacture the flexible display panel.

In accordance with another embodiment, a foldable display device includes a flexible display panel to display an image, the flexible display panel including a plurality of non-folding areas and a plurality of folding areas, each of the folding areas between at least two non-folding areas; and a retainer including a magnetic region and an electromagnetic region in different non-folding areas, wherein: the non-folding areas face each other when the flexible display panel is folded along the folding areas, the magnetic region faces the electromagnetic region when the flexible display panel is in a folded state, and the folded state is maintained by an electromagnetic force generated between the electromagnetic region and magnetic region.

BRIEF DESCRIPTION OF THE DRAWINGS

Features will become apparent to those of skill in the art by describing in detail exemplary embodiments with reference to the attached drawings in which:

FIG. 1 illustrates an embodiment of a foldable display device;

FIG. 2 illustrates a side view of the foldable display device;

FIG. 7 illustrates another embodiment of a foldable display device;

FIG. 8 illustrates a side view the foldable display device in FIG. 7;

DETAILED DESCRIPTION

Figure 3:
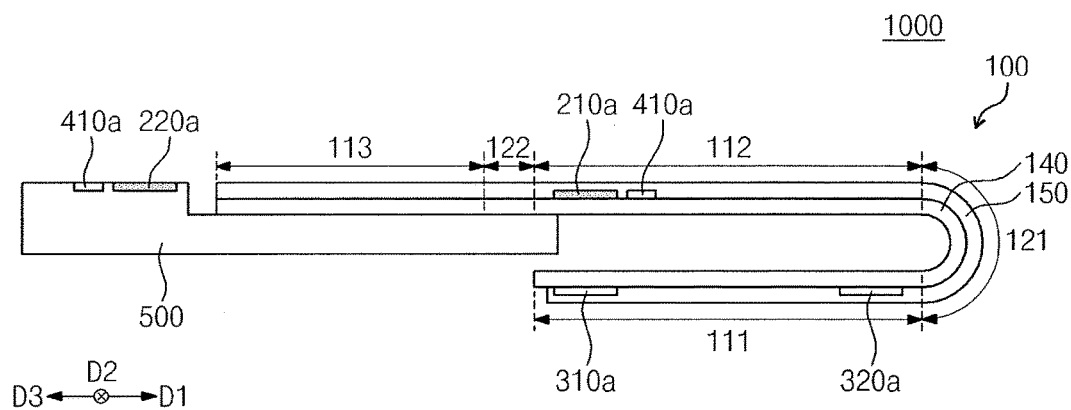
FIG. 3 illustrates a flexible display panel in FIG. 1 folded once.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 4:
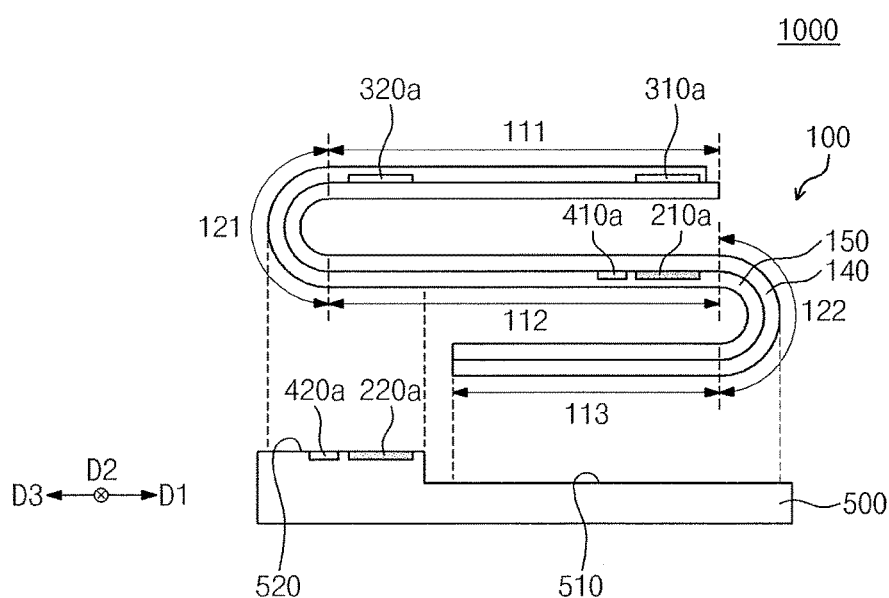
FIG. 4 illustrates the flexible display panel in FIG. 1 folded twice.

FIG. 1 illustrates an embodiment of a display device 1000 which includes a flexible display panel. FIG. 2 illustrates a side view of the display device in an unfolded state. FIG. 3 illustrates the flexible display panel folded once. FIG. 4 illustrates the flexible display panel folded twice.

Referring to FIGS. 1 to 4, the display device 1000 includes a flexible display panel 100, a control board 200, a folding maintaining part, and a frame 500. The foldable display device 1000 displays visible information such as text, video, picture, and two- and/or three-dimensional images. Hereinafter, the visible information will be referred to as an image.

The flexible display panel 100 may be an organic light emitting display panel, a liquid crystal display panel, a plasma display panel, an electrophoretic display panel, or another type of display panel.

The flexible display panel 100 includes a lower plate 140 facing an upper plate 150. A light control layer is disposed between the lower plate 140 and the upper plate 150. The upper plate 150 and light control layer correspond to a display area DA, and the lower plate 140 corresponds to the display area DA and a non-display area NDA. Each of the lower plate 140 and the upper plate 150 includes at least one electrode to apply an electric field to the light control layer. The intensity of the electric field may be controlled to control display of the image. The image is displayed in an upward direction on the flexible display panel 100 through the upper plate 150.

The control board 200 includes a memory, a processor, and an operating system to drive flexible display panel 100. The control board 200 receives image information from an external source and generates image data based on the image information. The flexible display panel 100 receives the image data and displays an image corresponding to the image data.

The flexible display panel 100 may have various shapes. In one embodiment, the flexible display panel 100 has a rectangular plate shape with two pairs of sides. Each pair includes two sides substantially parallel to each other. In one implementation, the flexible display panel 100 may have short sides and long sides. For instance, the flexible display panel 100 may have a rectangular shape including four straight sides. A direction in which the long sides extend may be referred to as first direction D1 and a direction in which the short sides extend may be referred to as a second direction D2. In another embodiment, the panel 100 may have a square shape.

The flexible display panel 100 has flexibility in all or a portion thereof. In one embodiment, elements of the flexible display panel 100 are formed of flexible materials. For example, the flexible display panel 100 may be formed from plastic, thin-metal plate, or thin-glass plate. The display panel 100 may be folded by external force during use.

In accordance with one embodiment, the term "folded" may indicate that a state where the flexible display panel 100 is deformed from its original shape to another shape, without being fixed to a particular shape. For example, "folded" may include a state where the flexible display panel 100 is folded or bended in one or more areas, curved in a curved shape, or rolled up like a scroll.

In one embodiment, the flexible display panel 100 is folded in a folding area and not folded in a non-folding area. The folding and non-folding areas indicate arbitrary areas of the flexible display panel 100. As described above, because the flexible display panel 100 is flexible, the display panel 100 may be folded in various shapes by an applied external force. Thus, the folding and non-folding areas may vary.

The non-folding area includes first, second, and third non-folding areas 111, 112, and 113. The first to third non-folding areas 111 to 113 are sequentially arranged in a third direction D3 opposite to first direction D1.

The folding area includes first and second folding areas 121 and 122. The first folding area 121 is between the first and second non-folding areas 111 and 112. The second folding area 122 is between the second and third non-folding areas 112 and 113. The display area DA extends in the first direction D1 and overlaps with the first to third non-folding areas 111 to 113 and the first and second folding areas 121 and 122.

The first to third non-folding areas 111 to 113 may have various shapes. For example, each of the first to third non-folding areas 111 to 113 may have a rectangular shape and the first and second non-folding areas 111 and 112 have a same area. The third non-folding area 113 may have an area smaller than first and second non-folding areas 111 and 112.

The first and second folding areas 121 and 122 may have various shapes. For example, each of the first and second folding areas 121 and 122 may have a rectangular shape extending in second direction D2.

The first and second folding areas 121 and 122 and the first to third non-folding areas 111 to 113 may partially overlap display area DA. Therefore, the first and second folding areas 121 and 122 and the first to third non-folding areas 111 to 113 display the images through display area DA. The flexible display panel 100 folds in the first and second folding areas 121 and 122. The flexible display panel 100 may be folded in various ways. For example, the flexible display panel 100 is folded to allow the first to third non-folding areas 111 to 113 to overlap each other.

In one embodiment, the flexible display panel 100 is folded in the first folding area 121, in order to allow the first and second non-folding areas 111 and 112 to face each other. This folding may be referred to as a first folding. In this state, a lower surface of the flexible display panel 100 corresponding to the first non-folding area 111 faces a lower surface of the flexible display panel 100 corresponding to the second non-folding area 112.

The flexible display panel 100 is also folded in the second folding area 122, in order to allow the second and third non-folding areas 112 and 113 to face each other. This folding may be referred to as a second folding. In this state, an upper surface of the flexible display panel 100 corresponding to the second non-folding area 112 faces an upper surface of the flexible display panel 100 corresponding to the third non-folding area 113.

The frame 500 is disposed under the flexible display panel 100. The flexible display panel 100 is folded two times and then placed on the frame 500. Thus, the frame 500 has a shape corresponding to flexible display panel 100 in the second folded state, when viewed in a plan view. For example, the frame 500 has a rectangular shape corresponding to the flexible display panel 100 in the second folded state when viewed in a plan view, and has an area equal to or greater than the flexible display panel 100 in the second folded state. The frame 500 includes a material with high rigidity, e.g., a metal or plastic having high rigidity.

Accordingly, the frame 500 protects the flexible display panel 100 placed thereon after being folded a second time. In addition, a user may fold the flexible display panel 100 two times and place the flexible display panel 100 on the frame 500, so that the user may easily carry the flexible display panel 100.

The frame 500 includes a first surface 510 and a second surface 520, which are sequentially arranged in third direction D3 and which face the lower surface of the flexible display panel 100.

The third non-folding area 113 may be fixed to the first surface 510 in various ways. For instance, an adhesive film (e.g., optically clear adhesive (OCA)) may be disposed between the first surface 510 and the third non-folding area 113. The first surface 510 and the third non-folding area 113 may be attached to each other by the adhesive film. The third non-folding area 113 may be fixed to the first surface 510 by structures formed on the first surface 510 and/or the third non-folding area 113.

The first surface 510 may have a same shape as the third non-folding area 113. In one embodiment, the first surface 510 may have the same rectangular shape as the third non-folding area 113. The area of the first surface 510 may be equal to or greater than the third non-folding area 113.

When the flexible display panel 100 is folded a second time, the lower surface of the second non-folding area 112 is disposed to face second surface 520. The second surface 520 is located at a position higher than the first surface 510. When the flexible display panel 100 is folded a second time, the second non-folding area 112 is located at a position higher than the first non-folding area 111, due to a thickness of the flexible display panel 100. Therefore, the second surface 520 is located at a position higher than the first surface 510. As a result, the display panel 100 may be stably placed on the frame 500.

The second non-folding area 112 may face the first and second surfaces 510 and 520, when the flexible display panel 100 is placed on the frame 500 after being folded twice. The sum of the area of the first surface 510 and the area of the second surface 520 may be equal to or greater than that of the flexible display panel 100, folded a second time, from the perspective of a plan view. The control board 200 is disposed on the frame 500. The control board 200 may be electrically connected to the flexible display panel 100 by a flexible printed circuit board.

A folding maintaining part (or retainer) may retain the folded state of the flexible display panel 100. For example, because at least a portion of the flexible display panel 100 has the flexibility, display panel 100 may tend to return to its original shape due to a restoring force, when an external force is not continuously applied to the flexible display panel 100. Thus, the flexible display panel 100 may tend not to maintain the first and second folded states. However, the foldable display device 1000 suppresses the restoring force using the folding maintaining part, and may therefore maintain the first and second folded states.

In one embodiment, the folding maintaining part includes first and second electromagnetic regions and first and second magnetic regions.

The first magnetic region is disposed in the first non-folding area 111 and may include a first right magnetic region 310a and a first left magnetic region 310b. The first magnetic region is disposed on the lower plate 140 to correspond to the non-display area NDA. For example, the first right magnetic region 310a is disposed in the non-display area NDA relatively in a fourth direction D4 opposite to the second direction D2. The first left magnetic region 310b is disposed in the non-display area NDA relatively in the second direction D2.

The first right magnetic region 310a and the first left magnetic region 310b may have various shapes. For example, each of the first right magnetic region 310a and the first left magnetic region 310b may have a rectangular shape extending in first direction D1.

The second magnetic region may be disposed in the first non-folding area 111 and may include a second right magnetic region 320a and a second left magnetic region 320b. The second magnetic region is disposed on the lower plate 140 to correspond to the non-display area NDA and is spaced from the first magnetic region.

In one embodiment, the second magnetic region is relatively disposed in the third direction D3 by a greater amount than the first magnetic region. The second right magnetic region 320a is disposed in the non-display area NDA positioned at the lower direction, e.g., fourth direction D4, with respect to display area DA. The second left magnetic region 320b is disposed in the non-display area NDA positioned at the upper direction, e.g., the second direction D2, with respect to the display area DA. The second right magnetic region 320a and the second left magnetic region 320b may have various shapes. For example, each of the second right magnetic region 320a and the second left magnetic region 320b may have a rectangular shape extending in the first direction D1.

The first electromagnetic region may be disposed in the second non-folding area 112 and may include a first right electromagnetic region 210a and a first left electromagnetic region 210b. The first electromagnetic region is disposed on lower plate 140 to correspond to the non-display area NDA.

The first right electromagnetic region 210a is disposed in the non-display area NDA positioned at the lower direction, e.g., the fourth direction D4, with respect to display area DA. The first left electromagnetic region 210b is disposed in the non-display area NDA positioned at the upper direction, e.g., the second direction D2, with respect to the display area DA.

In addition, the first electromagnetic region is disposed to face the first magnetic region when the flexible display panel 100 is first folded. For example, when the flexible display panel 100 is first folded, the first right electromagnetic region 210a and the first right magnetic region 310a face each other in up and down directions, and the first left electromagnetic region 210b and the first left magnetic region 310b face each other in up and down directions.

The first right electromagnetic region 210a and the first left electromagnetic region 210b may have various shapes. For example, the first right electromagnetic region 210a and the first left electromagnetic region 210b may have a rectangular shape extending in the first direction D1, to correspond to the first right magnetic region 310a and the first left magnetic region 310b.

The second electromagnetic region is disposed on the second surface 520 of frame 500 and includes a second right electromagnetic region 220a and a second left electromagnetic region 220b. The second right electromagnetic region 220a is relatively disposed in the fourth direction D4 on the second surface 520, and the second left electromagnetic region 220b is relatively disposed in the second direction D2 on the second surface 520.

The second electromagnetic region is disposed to face the second magnetic region when the flexible display panel 100 is folded a second time. For example, when the display panel 100 is folded twice, the second right electromagnetic region 220a and the second right magnetic region 320a face each other in up and down directions, and the second left electromagnetic region 220b and the second left magnetic region 320b face each other in up and down directions.

The second right electromagnetic region 220a and second left electromagnetic region 220b may have various shapes. For example, the second right electromagnetic region 220a and the second left electromagnetic region 220b may have a rectangular shape extending in first direction D1 corresponding to the second right magnetic region 320a and the second left magnetic region 320b.

The first and second electromagnetic regions include an electromagnet. First and second driving currents are applied to the first and second electromagnetic regions, respectively. The first and second electromagnetic regions are driven by the first and second driving currents, respectively. In this case, the first and second electromagnetic regions generate an electromagnetic force in response to the first and second driving currents.

The first and second electromagnetic regions include wirings to carry the first and second driving currents. The wirings include a metal material. In this case, the wirings are formed through at least a portion of one or more processes used to manufacture the flexible display panel 100. The processes used to manufacture display panel 100 may include, for example, a heat deposition process, a sputtering process, etc. The first and second electromagnetic regions may be formed to have a wiring shape, e.g., plural signal wirings, and may include circuits formed of materials to transfer current. Accordingly, the first and second electromagnetic regions may be formed using a portion of processes used to form the signal wirings.

The first and second magnetic regions include a magnetic substance. Therefore, the first and second magnetic regions generate an attractive force or repulsive force against an electromagnetic field or a magnetic field from the outside. The first and second magnetic regions may include a ferromagnetic substance, a paramagnetic substance, a resinmagnetic substance, or a combination thereof. In another embodiment, the first and second magnetic regions may include an electromagnet. The first and second magnetic regions may be formed through at least a portion of processes used to manufacture the flexible display panel 100.

As described above, when flexible display panel 100 is first folded, the first electromagnetic region and first magnetic region face each other in up and down directions. In this case, because the first driving current is applied to the first electromagnetic region and the first electromagnetic region generates the electromagnetic field, an attractive force is generated between the first electromagnetic region and first magnetic region by the electromagnetic force. Thus, flexible display panel 100 may be maintained in the first folded state.

In addition, when flexible display panel 100 is folded a second time, the second electromagnetic region and second magnetic region face each other in up and down directions, while the first folded state is maintained by the first electromagnetic region and first magnetic region. Because the second driving current applied to the second electromagnetic region and second electromagnetic region generates the electromagnetic field, an attractive force is generated between the second electromagnetic region and second magnetic region by the electromagnetic force. Thus, foldable display device 1000 may be maintained in the second folded state.

Generally, when an attractive force caused by an electric field is used, noise may occur in the light control layer. This is because the light control layer is driven by the electric field, but the magnetic field does not exert influence on the drive of the light control layer. Accordingly, driving noise caused by folding maintaining part is not generated in flexible display panel 100.

When the attractive force is generated by the magnetic substance, a magnetic force generated from the magnetic substance becomes weak over time. Therefore, an attractive force generated by the magnetic substance is reduced.

However, in accordance with at least one embodiment, because an attractive force is generated by the electromagnetic force of the electromagnet, the attractive force may be constantly maintained and controlled. In addition, the first and second electromagnetic regions are easily formed because the electromagnet is formed through at least a portion of one or more processes used to manufacture flexible display panel 100.

In one embodiment, the second magnetic region is disposed in the first non-folding area 111. In an alternative embodiment, positions of the first and second electromagnetic regions and first and second magnetic regions may be different. For instance, the second magnetic region may be disposed in the second non-folding area 112 rather than the first non-folding area 111. In this case, the second magnetic region and second electromagnetic region face each other in up and down directions, when the flexible display panel 100 is folded a second time.

The foldable display device 1000 may include a sensor and an electromagnet controller. The sensor applies a sensing signal to the electromagnet controller. The sensor may include a first sensor to sense the first folded state of display device 1000 and a second sensor to sense the second folded state of the display device 1000. The sensing signal includes a first sensing signal and a second sensing signal.

The first sensor may include a first right sensor 410a and a first left sensor 410b. The first sensor may be disposed on a surface of at least one of the first or second non-folding areas 111 and 112. In one embodiment, the first sensor is disposed in second non-folding area 112 to face the first non-folding area 111. For example, the first sensor may be disposed on the lower plate 140 to be adjacent to the first electromagnetic region and to correspond to the non-display area NDA. Accordingly, the first right sensor 410a may be disposed on the lower plate 140 to correspond to the non-display area NDA in the fourth direction D4 with respect to the display area DA. The first left sensor 410b may be disposed on the lower plate 140 to correspond to the non-display area NDA in the second direction D2 with respect to the display area DA.

The first sensor outputs the first sensing signal in accordance with the first folded state. The first sensing signal may include an off-signal and an on-signal different from the off-signal. For example, when the flexible display panel 100 is completely stretched out, the first and second non-folding areas 111 and 112 do not face each other. Therefore, the first sensor outputs the off-signal. When the flexible display panel 100 is first folded, the first and second non-folding areas 111 and 112 face each other and the first sensor outputs the on-signal.

The second sensor includes a second right sensor 420a and a second left sensor 420b. The second sensor is disposed on a surface of at least one of the second non-folding area 112 or the second surface 520. For example, the second sensor is disposed on the second surface 520 to correspond to the second non-folding area 112. In one embodiment, the second sensor is disposed on the second surface 520 to be adjacent to the second electromagnetic region. Therefore, the second right sensor 420a is disposed on the second surface 520 in fourth direction D4, and the second left sensor 420b is disposed on the second surface 520 in the second direction D2.

The second sensor outputs the second sensing signal based on the second folded state. The second sensing signal may include an off-signal and on-signal. For example, when the display panel 100 is completely stretched out or first folded, the second non-folding area 112 and the second surface 520 do not face each other. Thus, the second sensor outputs the off-signal. When the flexible display panel 100 is second folded, the second non-folding area 112 and the second surface 520 face each other. When this occurs, the second sensor outputs the on-signal.

In one embodiment, the sensor senses an approaching object or existence of the object based on the electromagnetic field or an infrared ray, without having to mechanically contact the object. The sensor may include, for example, at least one of a proximity sensor, a contact sensor, or a hook sensor. The proximity sensor may be, for example, a photoelectric sensor, a high-frequency oscillation type proximity sensor, a capacitance type proximity sensor, a magnetic type proximity sensor, or an infrared ray type proximity sensor.

The electromagnet controller controls the first and second driving currents. The electromagnet controller may be disposed on control board 200. In another embodiment, the electromagnet controller may be disposed on flexible display panel 100. For instance, when an integrated circuit is formed on the flexible display panel 100, the electromagnet controller may be implemented by the integrated circuit. The electromagnet controller receives the first and second sensing signals and controls the first and second driving currents in response to the first and second sensing signals.

For instance, when the flexible display panel 100 is stretched out, the electromagnet controller receives the off-signal from each of the first and second sensors. In this case, the electromagnet controller does not apply the first driving current to the first electromagnetic region and the second driving current to the second electromagnetic region. Accordingly, the first and second electromagnetic regions are not driven.

When the flexible display panel 100 is first folded, the electromagnet controller receives the on-signal from the first sensor and the off-signal from the second sensor. Then, the electromagnet controller applies the first driving current to the first electromagnetic region to drive the first electromagnetic region. Therefore, the first folded state of the flexible display panel 100 is maintained by the first electromagnetic region and first magnetic region. Meanwhile, the electromagnet controller does not apply the second current to the second electromagnetic region. As a result, the second electromagnetic region is not driven.

When the flexible display panel 100 is folded a second time, the electromagnet controller receives the on-signal from each of the first and second sensors. Then, the electromagnet controller applies the first driving current to the first electromagnetic region to drive the first electromagnetic region. Thus, the first folded state of the flexible display panel 100 is maintained by the first electromagnetic region and first magnetic region. In addition, the electromagnet controller applies the second driving current to the second electromagnetic region to drive the second electromagnetic region. Accordingly, the second folded state of the flexible display panel 100 is maintained by the second electromagnetic region and second magnetic region.

The control board 200 controls the image displayed on the flexible display panel 100 based on sensing signals from the sensors. In one embodiment, the foldable display device 1000 displays the image only on the surface of the flexible display panel 100, which is recognized by the user and does not display the image on the surface of the flexible display panel 100, which is not recognized by the user.

For example, when the flexible display panel 100 is completely stretched out, the control board 200 receives the off-signal from each of the first and second sensors. Then, the control board 200 compensates for the image data based on the off-signal to generate a first image data. The flexible display panel 100 displays the image over the entire display area DA based on the first image data.

When the flexible display panel 100 is first folded, the control board 200 receives the on-signal from the first sensor and the off-signal from the second senor. Then, the control board 200 compensates for the image data based on the on-signal and the off-signal, to generate second image data. The flexible display panel 100 displays the image through the display area DA corresponding to the second and third non-folding areas 112 and 113 and the second folding area 122, and does not display the image through remaining display areas based on the second image data.

When the flexible display panel 100 is folded a second time, the control board 200 receives the on-signal from the first sensor and the on-signal from the second senor. Then, the control board 200 compensates for the image data based on the on-signals to generate a third image data. The flexible display panel 100 displays the image through display area DA corresponding to the first non-folding area 111, and does not display the image through remaining display areas based on the third image data.

As described above, when the foldable display device 1000 includes the sensors, the first and second electromagnetic regions are driven in accordance with the folded states of the flexible display panel 100. Therefore, although the user does not provide separate inputs to the foldable display device 1000, the flexible display panel 100 is maintained in the first and second folded states. Thus, the usability of the foldable display device 1000 is improved.

In addition, when the flexible display panel 100 is stretched out, both the first and second electromagnetic regions are not driven. Further, when the flexible display panel 100 is first folded, the second electromagnetic region is not driven. Accordingly, power consumption to drive the first and second electromagnetic regions may be reduced. In addition, because the image displayed in display area DA is compensated in accordance with the folded states of the flexible display panel 100, usability of the foldable display device 1000 is improved.

Figure 5:
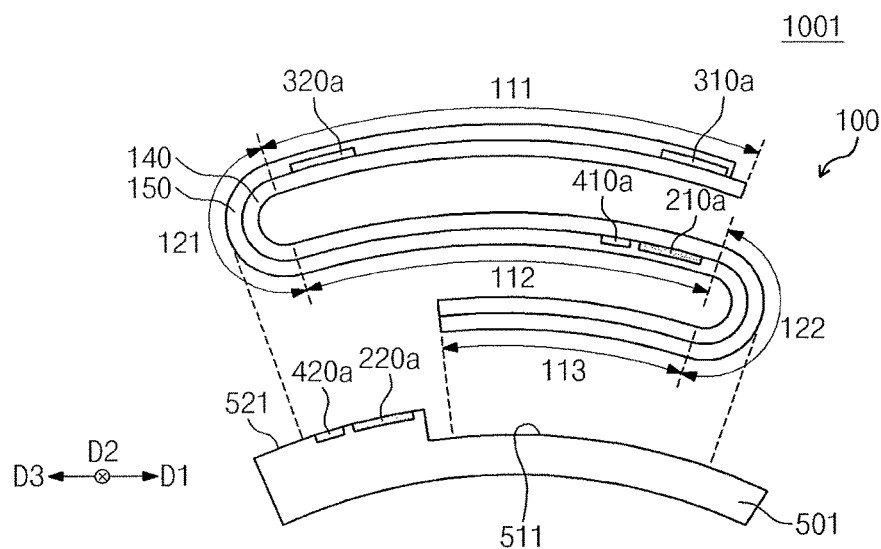
FIG. 5 illustrates another embodiment of a foldable display device.

FIG. 5 illustrates a side view of another embodiment of a foldable display. Referring to FIG. 5, a frame 501 has a curved shape in the second direction D2. First and second surfaces 511 and 521 include curved surfaces corresponding to the curved shape of the frame 501. The curved surfaces are curved in the second direction D2. The curved surfaces are convex relative to flexible display panel 100, and may have a substantially U-shape rotated at a predetermined angle, e.g., 180°. For example, the curved surfaces may be convex to a direction opposite to the flexible display panel 100 to have a U-shape.

The flexible display panel 100 is placed on the frame 501 after being folded a second time. In this case, the flexible display panel 100 bends along the curved surfaces of the first and second surfaces 511 and 521, and then placed on the frame 501. That is, the first, second, and third non-folding areas 111, 112, and 113 are curved along the second direction D2.

In this case, the user may see the image displayed through the first non-folding area 111 that is curved. Accordingly, the image displayed in the foldable display device 1001 has improved three-dimensional effect and improved depth.

Figure 6:
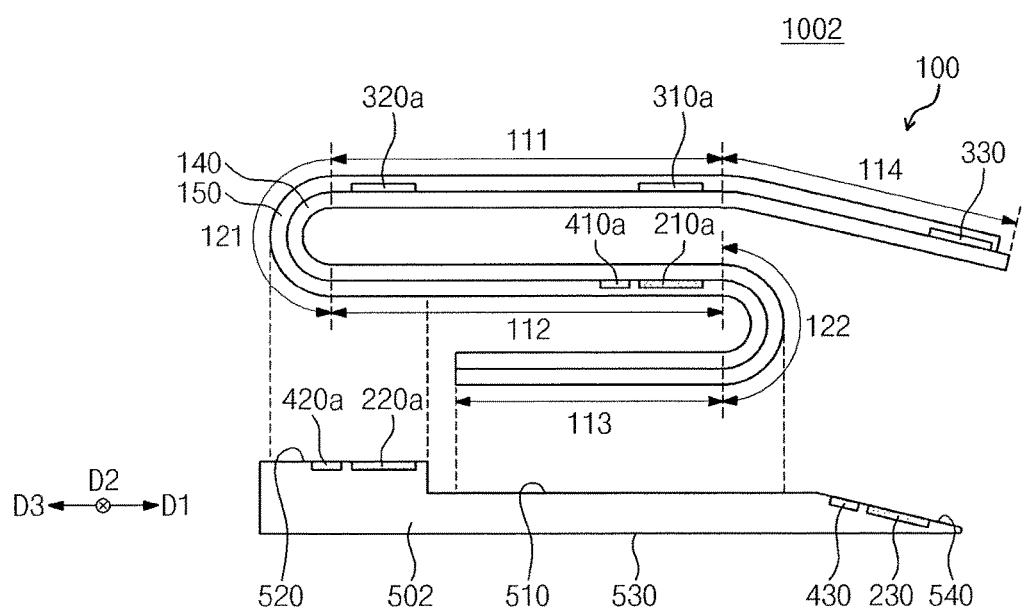
FIG. 6 illustrates another embodiment of a foldable display device.

FIG. 6 illustrates another embodiment of a side view a foldable display device. Referring to FIG. 6, a frame 502 includes a rear surface 530 and inclined surface 540. The rear surface 530 is opposite to first and second surfaces 510 and 520. The inclined surface 540 is between the first surface 510 and the rear surface 530, and extends from one end of the first surface 510 along first direction D1. In one embodiment, inclined surface 540 has a flat plate shape. In other embodiments, the inclined surface 540 may be a convex or concave curved surface.

The flexible display panel 100 may also include an inclined non-folding area 114 extending from one end of the first non-folding area 111 in the first direction D1. The flexible display panel 100 is not folded in the inclined non-folding area 114. When the flexible display panel 100 is placed on the frame 502 after being folded a second time, the inclined non-folding area 114 is disposed to face the inclined surface 540.

A foldable display device 1002 includes a third electromagnetic region 230, a third magnetic region 330, and a third sensor 430. The third magnetic region 330 is disposed in the inclined non-folding area 114, and the third electromagnetic region 230 is on the inclined surface 540. The third electromagnetic region 230 and the third magnetic region 330 face each other in up and down directions, when the flexible display panel 100 is placed on frame 502 after being folded a second time. The third electromagnetic region 230 is applied with a third driving current. In this case, the third electromagnetic region 230 may generate the electromagnetic force in response to the third driving current.

The third sensor 430 is disposed on the inclined surface 540 adjacent to the third electromagnetic region 230. The third sensor 430 outputs a third sensing signal, including off- and on-signals, depending on whether the inclined non-folding area 114 and the inclined surface 540 face each other. The electromagnet controller receives the third sensing signal and controls the third driving current in response to the third sensing signal.

When the inclined non-folding area 114 and the inclined surface 540 do not face each other, the electromagnet controller receives the off-signal from the third sensor. In this case, the electromagnet controller does not apply the third driving current to the third electromagnetic region. Accordingly, the third electromagnetic region is not driven.

When the inclined non-folding area 114 and the inclined surface 540 face each other, the electromagnet controller receives the on-signal from the third sensor. In this case, the electromagnet controller applies the third driving current to drive the third electromagnetic region. Therefore, the inclined non-folding area 114 and inclined surface 540 are maintained to face each other by the third electromagnetic region and third magnetic region.

Figure 9:
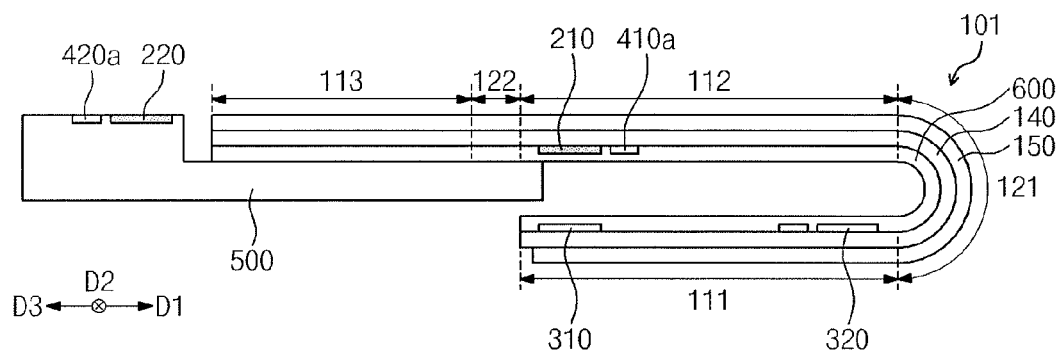
FIG. 9 illustrates a flexible display panel in FIG. 7 folded once.
Figure 10:
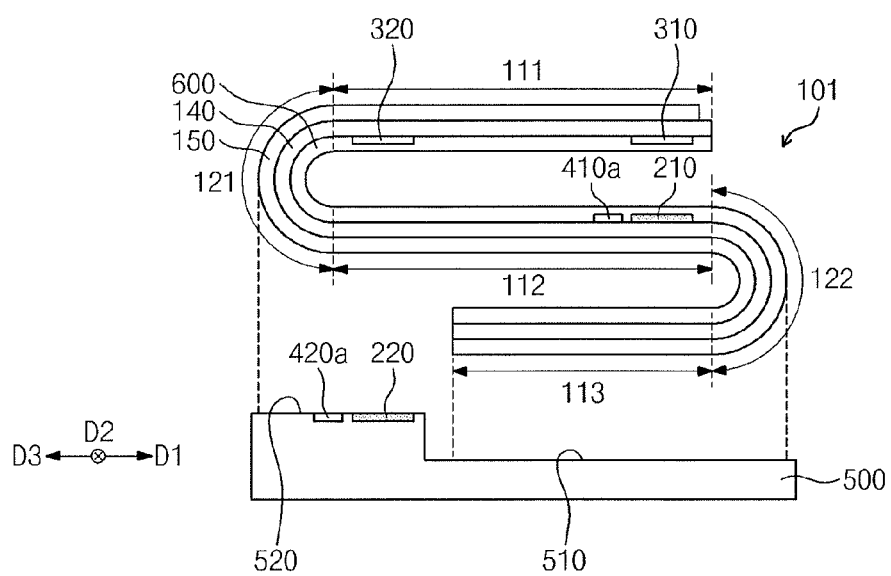
FIG. 10 illustrates the flexible display panel in FIG. 7 folded twice.

FIG. 7 illustrates another embodiment of a foldable display device. FIG. 8 illustrates a side view of the display device in FIG. 7. FIG. 9 illustrates a flexible display panel in FIG. 7, which is first folded. FIG. 10 illustrates a side view of the flexible display panel in FIG. 7, which is folded a second time.

Referring to FIGS. 7 to 10, the flexible display panel 101 of foldable display device 1003 includes a base film 600. The base film 600 serves as a substrate for the first and second electromagnetic regions and the first and second magnetic regions. The base film 600 is attached to the lower surface of the flexible display panel 101. For instance, the adhesive film is disposed between the base film 600 and the flexible display panel 101, to attach the base film 600 to the flexible display panel 101.

The base film 600 may have the same shape as the lower plate 140. Thus, the base film 600 may have a rectangular shape corresponding to the lower plate 140 and may have an area equal to or greater than that of the lower plate 140.

The base film 600 includes a material having flexibility, e.g., a resin. Accordingly, the base film 600 is folded together with the flexible display panel 101 when external force is applied thereto. The base film 600 includes a material having more rigidity than the flexible display panel 101. Therefore, the base film 600 may the support flexible display panel 101, because the base film 600 is folded only when the external force is applied at or greater than a predetermined intensity.

The base film 600 is not folded in the first to third non-folding areas 111 to 113, and is folded in the first and second folding areas 121 and 122. The folding maintaining part includes the first and second electromagnetic regions 210 and 220 and the first and second magnetic regions 310 and 320.

The first magnetic region 310 is disposed on the base film 600 to correspond to the first non-folding area 111. The second magnetic region 320 is disposed on the base film 600 to correspond to the first non-folding area 111, and is spaced from the first magnetic region 310. In one embodiment, the second magnetic region 320 is spaced from the first magnetic region 310 in third direction D3. In one embodiment, each of the first and second magnetic regions 310 and 320 has a rectangular shape extending in the second direction D2, to cross the display area DA and the non-display area NDA.

The first electromagnetic region 210 is disposed in the second non-folding area 112 and mounted on the base film 600 to correspond to non-display area NDA. The first electromagnetic region 210 and first magnetic region 310 are disposed to face each other in up and down directions, when the flexible display panel 101 is first folded.

The second electromagnetic region 220 is disposed on the second surface 520 of the frame 500 and mounted on the base film 600, to correspond to non-display area NDA. In addition, the second electromagnetic region 220 and the second magnetic region 320 are disposed to face each other in up and down directions, when the flexible display panel 101 is folded a second time. In one embodiment, the first and second electromagnetic regions 210 and 220 have a rectangular shape extending in the second direction D2, to correspond to the first and second magnetic regions 310 and 320.

Figure 11:
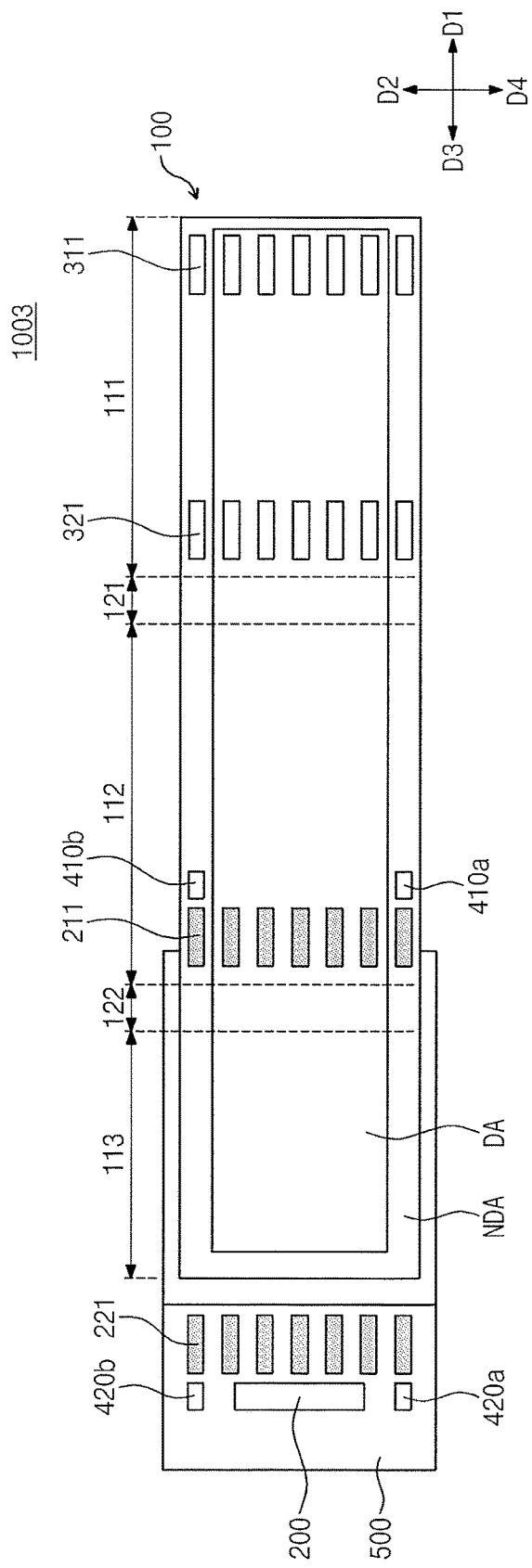
FIG. 11 illustrates another embodiment of a foldable display device.

As described above, each of the first magnetic region 310, the second magnetic region 320, and the first electromagnetic region 210 has a rectangular shape crossing the non-display area NDA and the display area DA. The second electromagnetic region 220 has a rectangular shape corresponding to the second magnetic region 320. In other embodiment, the first and second magnetic regions 310 and 320 and the first and second electromagnetic regions 210 and 220 may have different shapes. For instance, referring to FIG. 11, a plurality of first and second magnetic regions 311 and 321 and/or a plurality of first and second electromagnetic regions 211 and 221 may be provided.

For example, each first magnetic region 311 has a rectangular shape extending in first direction D1. Seven first magnetic regions 311 may be provided. The first magnetic regions may be arranged in the first non-folding area 111 along second direction D2, and may be spaced from each other at regular intervals. Portions of the first magnetic regions may correspond to non-display area NDA, and other portions of the first magnetic regions may correspond to the display area DA.

Each first electromagnetic region 211 may have a rectangular shape extending in first direction D1, to correspond to first magnetic region 311. Seven first electromagnetic regions 211 may be provided for respective first magnetic regions 311. The first electromagnetic regions 211 are disposed in the second non-folding area 112.

In addition, the first electromagnetic regions are arranged along second direction D2, and are spaced from each other at regular intervals to face the first magnetic regions when the flexible display panel 100 is first folded. Portions of the first electromagnetic regions are disposed to correspond to the non-display area NDA, and the other portions of the first electromagnetic regions are disposed to correspond to the display area DA.

Similarly, each second magnetic region 321 has a rectangular shape extending in the first direction D1. Seven second magnetic regions 321 may be provided. The second magnetic regions are arranged in the first non-folding area 111 along the second direction D2, and may be spaced from each other at regular intervals. In one embodiment, the second magnetic regions are spaced from the first magnetic regions in the third direction D3.

Each second electromagnetic region 221 has a rectangular shape extending along the first direction D1, to correspond to the second magnetic region 321. Seven second electromagnetic regions 221 may be provided. The second electromagnetic regions are disposed on the second surface 520.

In addition, the second electromagnetic regions are arranged along the second direction D2. The second electromagnetic regions may be spaced from each other at regular intervals to face the second magnetic regions when the flexible display panel 100 is folded a second time.

The first and second magnetic regions 310 and 320 and the first and second electromagnetic regions 210 and 220 may have various shapes and may be arranged in various ways, regardless of the display area DA and non-display area NDA of the display panel 101. Thus, the first and second folded states of the flexible display panel 100 may be more stably maintained.

By way of summation and review, various types of foldable display devices have been developed. These devices include a flexible display panel which can be folded by external force. However, the flexible display panel tends to return to its original open state due to a restoring force.

In accordance with one or more of the aforementioned embodiments foldable display device is provided which includes a flexible display panel which is retained in one or more folded states by a retainer. The retainer may include at least one magnet and at least one electromagnet. Also, the retainer may be formed during a manufacturing process of the display device.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless specifically indicated. Accordingly, it will be understood by those of skill in the art that various changes in form and details may be made without departing from the spirit and scope of the present invention as set forth in the following claims.

What is claimed is:

1. A foldable display device, comprising:
   a flexible display panel to display an image, the flexible display panel including a first non-folding area, a second non-folding area, and a first folding area between the first and second non-folding areas; and
   a retainer including at least one first electromagnet in the second non-folding area and at least one first magnet in the first non-folding area, wherein
   the first and second non-folding areas face each other when the flexible display panel is in a first folded state in the first folding area, and wherein
   the first folded state of the flexible display panel is maintained by a force generated by an electromagnetic field of the at least one first electromagnet and a magnetic field of the at least one first magnet.

2. The display device as claimed in claim 1, wherein:
   the flexible display panel includes a display area and a non-display area, and
   the at least one first electromagnet and the at least one first magnet are in the non-display area.

3. The display device as claimed in claim 2, wherein the flexible display panel includes:
   an upper plate,
   a lower plate facing the upper plate, and
   a light control layer between the upper and lower plates,
   wherein the lower plate corresponds to the display area and non-display area, wherein the upper plate and light control layer correspond to the display area, and wherein the at least one first electromagnet and the at least one first magnet are on the lower plate.

4. The display device as claimed in claim 1, wherein:
the retainer includes a base film attached to one surface of the flexible display panel, and
the at least one first electromagnet and at least one first magnet are on the base film.

5. The display device as claimed in claim 1, wherein:
the first and second non-folding areas are arranged in a first direction,
the first folding area extends in a second direction crossing the first direction, and
the at least one first electromagnet and the at least one first magnet extend in the first direction.

6. The display device as claimed in claim 1, further comprising:
a plurality of first electromagnets, and
a plurality of first magnets.

7. The display device as claimed in claim 1, further comprising:
a sensor in at least one of the first or second non-folding areas,
wherein the sensor is to sense whether the flexible display panel is the first folded state.

8. The display device as claimed in claim 7, wherein the sensor includes at least one of a proximity sensor, a contact sensor, or a hook sensor.

9. The display device as claimed in claim 7, further comprising:
an electromagnet controller to control a driving current to be applied to the at least one first electromagnet such that the force generated by the electromagnetic field of the at least one first electromagnet and the magnetic field of the at least one first magnet is controlled.

10. The display device as claimed in claim 9, wherein the electromagnet controller is to receive a sensing signal from the sensor and is to control the driving current in response to the sensing signal.

11. The display device as claimed in claim 7, further comprising:
a control board to drive the flexible display panel,
wherein the control board is to receive a sensing signal from the sensor and control display of the image based on the sensing signal.

12. The display device as claimed in claim 1, wherein the flexible display panel includes:
a third non-folding area and a second folding area between the second and third non-folding areas,
wherein the flexible display panel is folded a second time in the second folding area, and wherein the second and third non-folding areas face each other to allow the second non-folding area to be disposed between the first and third non-folding areas when the flexible display panel is a second folded state.

13. The display device as claimed in claim 12, further comprising:
a frame to support the flexible display panel in the second folded state.

14. The display device as claimed in claim 13, wherein the first non-folding area includes:
a second magnet spaced from the at least one first magnet, the frame including a second electromagnet corresponding to the second magnet when the flexible display panel is the second folded state.

15. The display device as claimed in claim 14, wherein the frame includes:
an upper surface on which the third non-folding area is placed
a rear surface opposite to the upper surface, and
an inclined surface connected between the upper surface and rear surface, wherein the flexible display panel includes an inclined non-folding area extending from one end of the first non-folding area and facing the inclined surface when the flexible display panel is the second folded state, and
wherein the inclined surface includes a third electromagnet placed thereon and the inclined non-folding area includes a third magnet corresponding to the third electromagnet when the flexible display panel is placed on the frame in the second folded state.

16. The display device as claimed in claim 14, wherein the frame has a curved shape which curves in the first direction.

17. The display device as claimed in claim 13, further comprising:
a control circuit to drive the flexible display panel,
wherein the control circuit is disposed on the frame.

18. The display device as claimed in claim 1, wherein the first magnet includes a ferromagnetic substance, a paramagnetic substance, a resin-magnetic substance, or a combination thereof.

19. The display device as claimed in claim 1, wherein the at least one first electromagnet is formed during manufacture the flexible display panel.

20. A foldable display device, comprising:
a flexible display panel to display an image, the flexible display panel including a plurality of non-folding areas and a plurality of folding areas, each of the folding areas between at least two non-folding areas; and
a retainer including a magnet and an electromagnet in different non-folding areas, wherein:
the non-folding areas face each other when the flexible display panel is folded along the folding areas,
the magnet faces the electromagnet when the flexible display panel is in a folded state, and
the folded state of the flexible display panel is maintained by a force generated by an electromagnetic field of the electromagnet and a magnetic field of the magnet.

* * * * *